(12) United States Patent
Visentin

(10) Patent No.: US 8,608,228 B2
(45) Date of Patent: Dec. 17, 2013

(54) DRAG-REDUCING DEVICE

(76) Inventor: Frank Visentin, Greely (CA)

( * ) Notice: Subject to any disclaimer, the term of this patent is extended or adjusted under 35 U.S.C. 154(b) by 0 days.

(21) Appl. No.: 13/380,179

(22) PCT Filed: Jun. 23, 2010

(86) PCT No.: PCT/CA2010/000979
§ 371 (c)(1),
(2), (4) Date: Dec. 22, 2011

(87) PCT Pub. No.: WO2010/148508
PCT Pub. Date: Dec. 29, 2010

(65) Prior Publication Data
US 2012/0104791 A1    May 3, 2012

Related U.S. Application Data

(60) Provisional application No. 61/219,561, filed on Jun. 23, 2009, provisional application No. 61/329,581, filed on Apr. 30, 2010.

(51) Int. Cl.
*B62D 35/00*    (2006.01)
(52) U.S. Cl.
USPC ..................................... 296/180.4
(58) Field of Classification Search
USPC ........... 296/180.1, 180.2, 180.3, 180.4, 180.5
See application file for complete search history.

(56) References Cited

U.S. PATENT DOCUMENTS

| | | | |
|---|---|---|---|
| 4,142,755 A | 3/1979 | Keedy | |
| 4,257,641 A | 3/1981 | Keedy | |
| 4,518,188 A | 5/1985 | Witten | |
| 5,058,945 A | 10/1991 | Elliott, Sr. et al. | |
| 5,823,610 A | 10/1998 | Ryan et al. | |
| 7,641,262 B2 * | 1/2010 | Nusbaum | 296/180.5 |
| 2007/0001481 A1 | 1/2007 | Breidenbach | |
| 2007/0126261 A1 | 6/2007 | Breidenbach | |
| 2008/0303310 A1 | 12/2008 | Breidenbach | |

FOREIGN PATENT DOCUMENTS

SU    823209 A1    4/1981

* cited by examiner

*Primary Examiner* — Joseph Pape
*Assistant Examiner* — Dana Ivey
(74) *Attorney, Agent, or Firm* — Miltons IP/p.i.

(57) ABSTRACT

An apparatus for reducing drag on a transport vehicle, which comprises retractable aerodynamic panels for deployment at the rear of the vehicle, behind the cabin, or both. When these panels are deployed, they provide an aerodynamic design, thereby reducing drag and turbulence as the vehicle travels, for example, down a highway, which in turn, reduces energy costs associated with transportation. When not in use, the panels retract adjacent to the planar surfaces of the vehicle (for example, the sides, top and bottom surfaces). The retracted panels are housed either on the outside surface of the vehicle; the inside surface of the vehicle, or within the walls of the vehicle. The retracted position of the panels allows for easy unloading of cargo from the rear of the vehicle when it is docked.

17 Claims, 16 Drawing Sheets

DRAG-REDUCING DEVICE

FIELD OF THE INVENTION

The present invention relates to a drag-reducing device for use with vehicles having surfaces that lack streamlining. Examples include trucks, trailers, truck-trailer boxes, semi-trailers, and the like. The term 'vehicle' is used to describe the all modes of transportation for which the invention can be applied. The device can be mounted at the rear of the vehicle, or, in between a cabin and a following trailer.

BACKGROUND OF THE INVENTION

As a vehicle increases its speed, so too does the amount of aerodynamic drag, which in turn, increases the amount of fuel consumption required for transport. This inefficiency leads to a direct increase in operating costs. As a result, there have been many efforts to reduce aerodynamic drag, particularly on transport vehicles which are not sufficiently streamlined to minimize aerodynamic drag.

In particular, transport vehicles, such as trucks, are susceptible to aerodynamic drag, due to the shape of the cabin and/or trailer. The drag is associated both with the rear of the truck, and in the case of tractor-trailer combinations, with the space between the cabin and trailer. Often, the rear-end of a trailer is a large planar surface, which results in an area of reduced pressure to be created behind the trailer box as it travels, for example, down a highway. This in turn, generates a retarding force that must be counteracted by additional engine power.

It follows that there have been many efforts to streamline the rear of such vehicles, through the use of airfoils and other similar devices mounted at the rear of the vehicle.

U.S. Patent Application No. 20080093886 (Nussbaum) discloses a retractable air deflection apparatus for reduction of vehicular air drag, comprising at least three air deflection elements, each of which is contoured in a wing-like shape, and each of which is disposed adjacent one of the angular trailing corner edges of the vehicle. This apparatus requires a complex series of mechanical linkages.

There have been other devices that essentially comprise panels at the rear of the vehicle, which fold up onto the rear doors when not in use (see, e.g. U.S. Patent Application Nos. 20090179456; 20080309122; and 20090200834; and U.S. Pat. Nos. 6,309,010; 6,485,087; 6,666,498 and 6,799,791). These panels are fully exposed to the elements, and do not deploy in a coordinated manner. Often, manual deployment by the vehicle operator is required. Furthermore, these devices are not easily adapted for reducing the aerodynamic drag in the space between the rear of a cabin and the front surface of an attached trailer.

Breidenbach discloses in U.S. Pat. No. 7,380,868 an aerodynamic drag reducing apparatus that includes a series of successively nesting shapes and/or frameworks that extend rearward for use in a drag reducing configuration and collapse for use in a space saving configuration. The apparatus is bulky when fully deployed, and is attached to the rear doors of the vehicle. Such an apparatus cannot be easily adapted to providing drag reduction in the space between a cabin and an attached trailer. Care must be taken not to damage the apparatus when opening the rear doors to load/unload cargo. In addition, the nesting elements require a large number of complex mechanical linkages for operation.

It would be advantageous to provide a drag reducing device that is relatively simple in construction, with aerodynamic panels that deploy in a coordinated manner (either manually or automatically), for use at the rear of the vehicle and/or the space between the rear of cabin and the front of an attached trailer. When used at the rear of the vehicle, the apparatus should not couple with the rear doors of the vehicle, so as to permit easy loading/unloading of vehicular cargo. Furthermore, when not in use, the apparatus should be shielded from the elements, and also, retracted so as not to create a traffic hazard.

SUMMARY OF THE INVENTION

The invention in its general form will first be described, and then its implementation in terms of preferred embodiments will be detailed hereafter. These embodiments are intended to demonstrate the principle of the invention, and the manner of its implementation. The invention in its broadest and more specific forms will then be further described, and defined, in each of the individual claims which conclude this Specification.

In one aspect of the present invention, there is provided an apparatus for reducing drag on a transport vehicle, the apparatus comprising a plurality of aerodynamic panels deployed in a direction opposite of travel of the vehicle, wherein each of the panels retracting into housing located adjacent to planar surfaces of the vehicle, wherein the aerodynamic panels are deployed and retracted in a coordinated manner, and when deployed, the panels are in contact with each other to provide a continuous aerodynamic design.

In a further aspect of the present invention, there is provided an apparatus for reducing drag at the rear of a moving transport vehicle, the apparatus comprising a plurality of aerodynamic panels deployed in a direction opposite of travel of the vehicle, each of the panels retracting into housing located adjacent to planar surfaces of the vehicle, wherein the aerodynamic panels are deployed and retracted in a coordinated manner, and when deployed, the panels are in contact with each other to provide a continuous aerodynamic design.

In yet a further aspect of the present invention, there is provided an apparatus for reducing drag behind a cabin of a transport vehicle, the apparatus comprising a plurality of aerodynamic panels deployed in a direction opposite of travel of the vehicle, each of the panels retracting into housing located adjacent to planar surfaces of the cabin, wherein the aerodynamic panels are deployed and retracted in a coordinated manner, and when deployed, the panels overlap with each other to provide a continuous aerodynamic design.

The device can be applied to drag reduction at the rear of the vehicle and/or in the space between a cabin and following trailer.

The apparatus, when applied to the rear of the vehicle, comprises retractable aerodynamic panels housed at the rear of the vehicle; means for coupling the panels; guide means for guiding the panels to their fully deployed and retracted positions; and means for deploying/retracting the panels. The guide means are coupled to the housing. The housing can either be external, internal, or integrated within the vehicle. Where the housing is external to the vehicle, means are provided to prevent wind and debris from entering into the housing and to provide a smooth finish to the sides of the vehicle.

The apparatus comprises retractable aerodynamic panels at the rear of the vehicle. When these panels are deployed, they provide an aerodynamic design to the rear of the vehicle, thereby reducing drag and turbulence as the vehicle travels, for example, down a highway, which in turn, reduces energy costs associated with transportation. When not in use, the panels retract adjacent to the planar surfaces of the vehicle (for example, the sides, top and bottom surfaces). The retracted panels are housed either on the outside surface of the vehicle; the inside surface of the vehicle, or within the walls of the vehicle. The retracted position of the panels allows for easy unloading of cargo from the rear of the vehicle when it is docked.

Retraction and deployment means are used to operate the panels. These means can function either manually or automatically. In a preferred embodiment, a series of pulleys, cables and rods are used as means to retract and deploy the panels. In addition, guide means are used to guide each panel as it retracts/deploys. The guide means preferably includes one or more rails, and means for the panels to slide along the rails. Finally, the panels are housed when retracted. The housing optionally includes a means to clean the panels, such as, but not limited to, bristles, brushes and the like.

In an optional feature, the housing includes bristles and or brushes to for cleaning the surface of the panels as they retract and deploy. When the panels are in the retracted position, the bristles guard the opening from debris, snow or foreign matter.

The apparatus can also be mounted between the rear cabin of a tractor and front end of a trailer. It can be mounted on the exterior or integrated over the sleeper portion of the cabin. The drag-reducing apparatus reduces drag by covering the space between the rear cabin of the tractor and the front end of a trailer. The apparatus adjusts for the various heights and widths of existing trailers. The apparatus can be incorporated as an extension of the truck cabin or added to vehicles and remain independent of the cabin. With the aid of sensors, the apparatus can adjust for distance between truck and trailer.

The apparatus comprises retractable aerodynamic panels housed at the rear of a cabin of the vehicle; means for coupling the panels; guide means for guiding the panels to their fully deployed and retracted positions; and means for deploying/retracting the panels. The guide means are coupled to the housing. The housing can either be external, internal, or integrated within the vehicle. Where the housing is external to the vehicle, means are provided to prevent wind and debris from entering into the housing and to provide a smooth finish to the sides of the vehicle. This can be designed for the various shapes of tractors as produced by truck manufacturers.

The apparatus comprises retractable aerodynamic panels at the rear of the tractor cabin. When these panels are deployed, they provide an aerodynamic design in between the tractor cabin and front end of a trailer attached to the tractor, thereby reducing drag and turbulence as the vehicle travels, for example, down a highway, which in turn, reduces energy costs associated with transportation. When not in use and at low speed when the drag is minimal or negligible, the panels retract adjacent to the side and top of the vehicle. An automated system retracts the panels below a predetermined speed. The deployed flexible panels allow for turns at highway speed. The retracted panels are housed either on the outside surface of the vehicle; the inside surface of the vehicle, or within the walls of the vehicle.

Retraction and deployment means are used to operate the panels. These means can function either manually or automatically. In a preferred embodiment, a series of pulleys, cables and rods preferably synchronized to a motorized system are used as means to retract and deploy the panels. In addition, guide means are used to guide each panel as it retracts/deploys. The guide means preferably includes one or more rails, and means for the panels to slide along the rails. Finally, the panels are housed when retracted. The housing optionally includes a means to clean the panels and to maintain a clean environment in the storage housing, such as, but not limited to, bristles, brushes and the like. The operating systems are housed behind accessible panels.

The foregoing summarizes the principal features of the invention and some of its optional aspects. The invention may be further understood by the description of the embodiments which follow.

Wherever ranges of values are referenced within this specification, sub-ranges therein are intended to be included within the scope of the invention unless otherwise indicated. Where characteristics are attributed to one or another variant of the invention, unless otherwise indicated, such characteristics are intended to apply to all other variants of the invention where such characteristics are appropriate or compatible with such other variants.

DETAILED DESCRIPTION OF PREFERRED EMBODIMENTS

The following is given by way of illustration only and is not to be considered limitative of this invention. Many apparent variations are possible without departing from the spirit and scope thereof.

Figure 1:
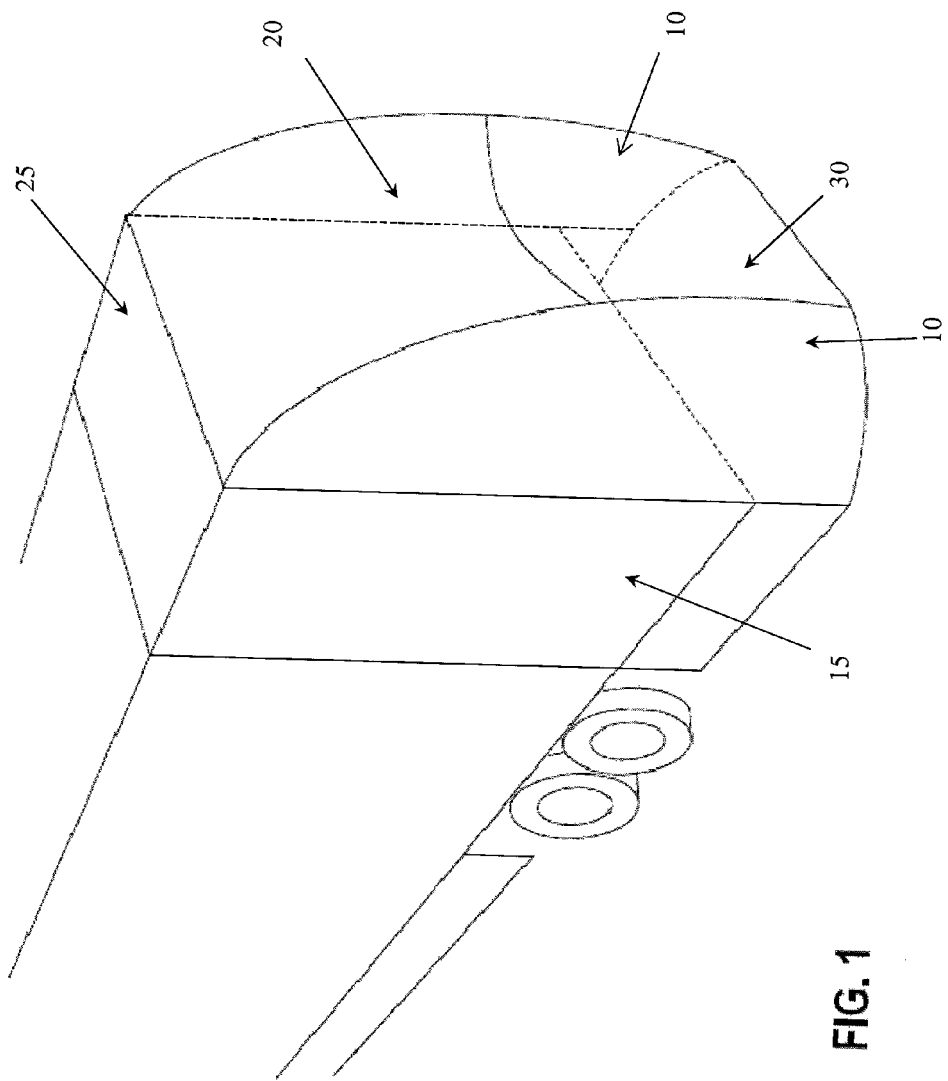
FIG. 1 illustrates a perspective view of an apparatus of the present invention deployed at the rear of a vehicle.

FIG. 1 illustrates a perspective view in which three aerodynamic panels deployed at the rear of a vehicle. There are two side panels (10) and an upper central panel (20). A fourth, optional panel (30), can also be used in the present invention.

The panels are attached to each other at the upper front corners, the details of which are described below. The size of the panels can vary according to the size of the vehicle, and according to the aerodynamic design. Furthermore, the shape of each panel can be varied, so long as the combination of all panels provides an aerodynamic design to the rear of the vehicle. In addition, the length of the central panel can vary, so long as an aerodynamic design is maintained at the rear of the truck. The panels are constructed of flexible, lightweight material such as, though not limited to, metal, plastic, fabric or any flexible material.

Each panel retracts into its respective housing (15, 25). In this embodiment, the housing is located on the outside portion of the truck (e.g. on the sides and the roof). In alternative embodiments, the housing can be located within the truck, for example, adjacent to the inner side walls and inner roof of the vehicle. In yet another embodiment, the housing is integrated into the side and upper walls of the truck. The housing serves to not only store the aerodynamic panels, but also house the underlying retraction/deployment mechanism.

Figure 2:
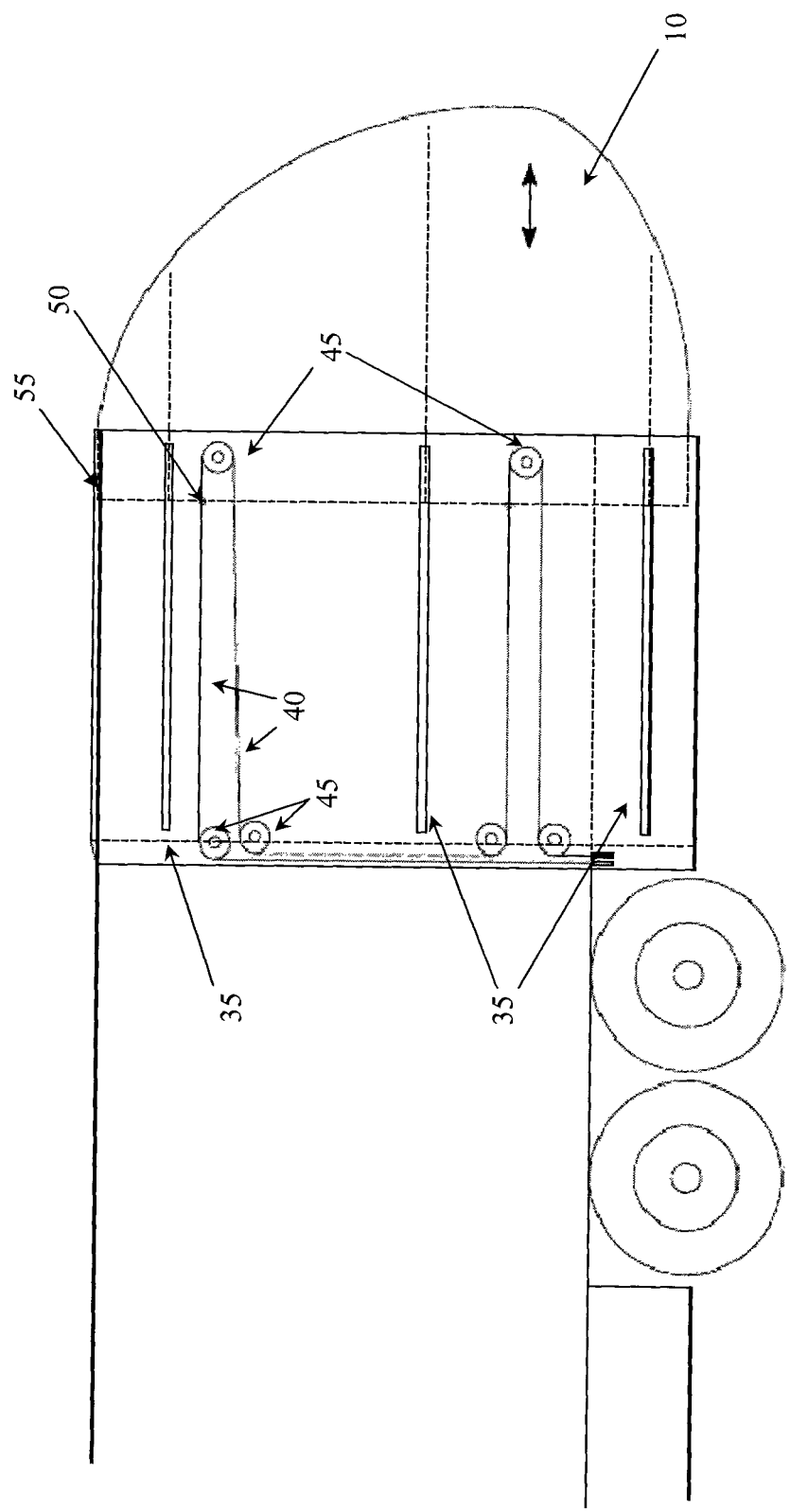
FIG. 2 illustrates a cut-away view of a side housing of the apparatus shown in FIG. 1, in which the side panel is fully deployed.

FIG. 2 illustrates a cut-away view of a side housing of the vehicle shown in FIG. 1, in which the retraction mechanism of a side panel is shown, while the side panel (10) is fully deployed. The two-way arrow shown in the Figures indicates the direction of movement of the panel as it retracts and deploys. The side panel (10) moves horizontally on one or more rails (35), with the movement of the panel controlled by a system comprising a flexible rod (55), cables (40) and pulleys (45). The cable/pulley system can either be motorized or used manually. If the system is motorized, it is connected to a motor (not shown) that is preferably located at the base of the truck.

The number of rails, and their respective spacing, can vary, depending on the height of the side panel. Taller panels will require more rails to ensure stability of horizontal movement. Each rail (35) is mounted horizontally within the housing, and guides the horizontal deployment of the panel (10).

Pulleys (45) are mounted, for example, at each end of the housing. The cable (40) which is wound around the pulleys controls the extent of the horizontal extension of the panel. For example, as shown in FIG. 2, the side panel (10) cannot extend rearward past an extension point (50). The mirror arrangement is found on the other side of the vehicle.

Figure 3:
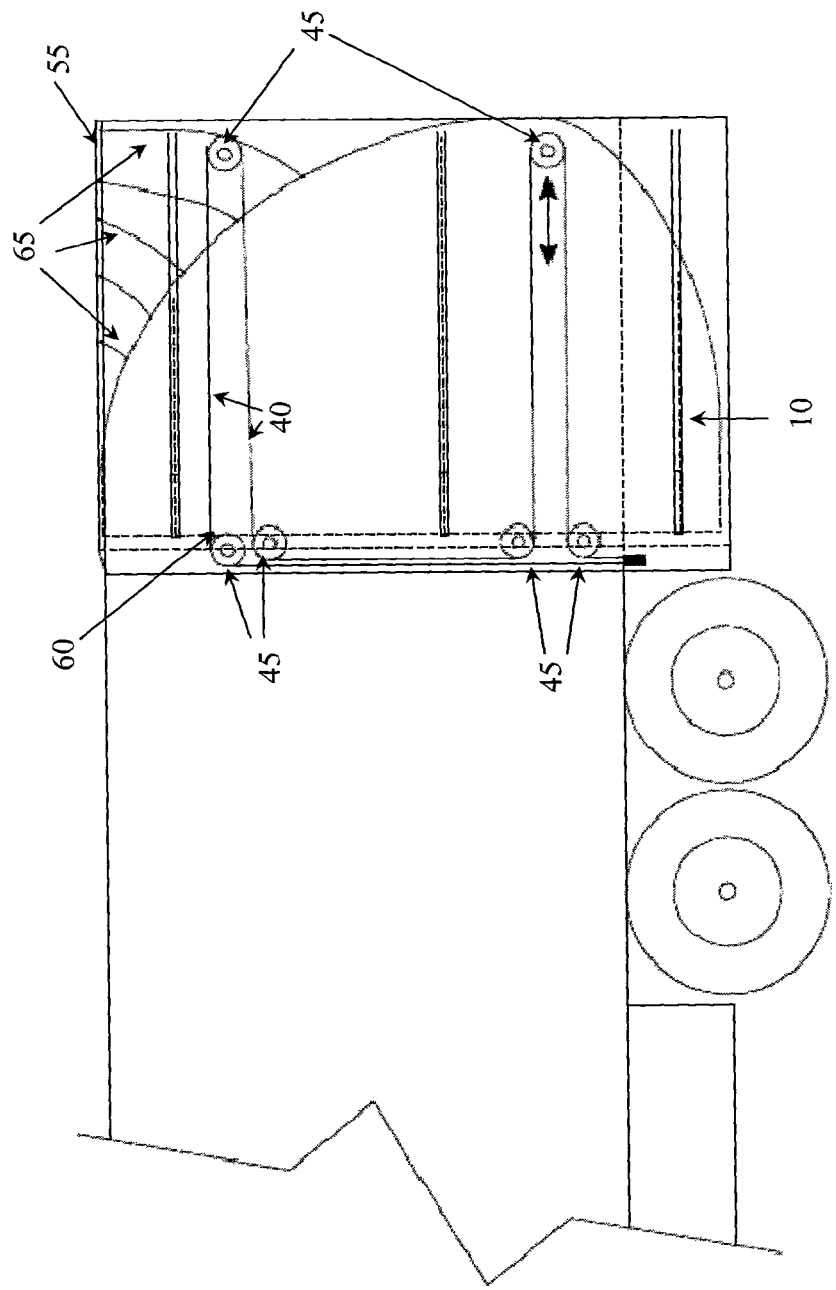
FIG. 3 illustrates a cut-away view of a side housing of the apparatus shown in FIG. 1, in which the side panel is fully retracted.

FIG. 3 illustrates a cut-away view of a side housing of the vehicle shown in FIG. 1, in which the retraction mechanism of a side panel (10) is shown, while the side panel (10) is fully retracted. Again, the pulley/cable mechanism (40, 45) controls how far the side panel retracts horizontally. For example, as shown in FIG. 2, the side panel (10) cannot retract past a retraction point (60). A series of cables (65) connect the side panel (10) to the central panel (not shown), via a flexible rod (55). When the panels are fully retracted, as in FIG. 3, the cables (65) are "lax". In the fully deployed position, these cables (65) are taught. The cables (65) and flexible rod (60) are a means to couple each side panel (10) to the central panel for coordinated deployment. The flexible rods are also a means to raise the connecting cables above the roof of the vehicle as the retraction progresses. The same arrangement is found on the other side of the vehicle.

Figure 4:
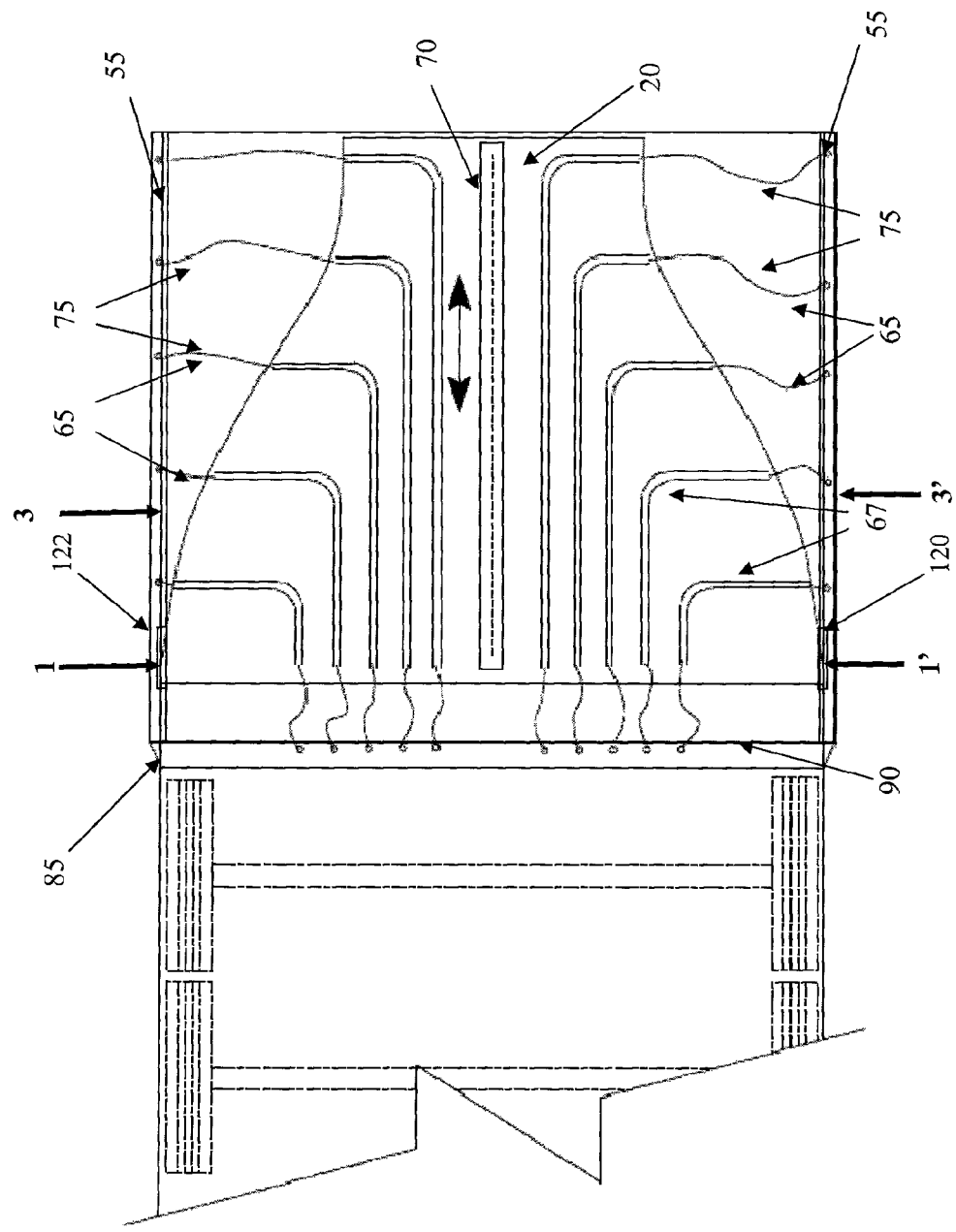
FIG. 4 illustrates a cut-away view of the central housing of the apparatus shown in FIG. 1, in which the central panel is fully retracted.

FIG. 4 illustrates a cut-away view of the central upper housing of the vehicle shown in FIG. 1, in which the retraction mechanism of the central panel (20) is shown, while the central panel (20) is fully retracted.

The shape of the central panel (20) is designed so as to fit snugly with the contour of each side panel, and provide an overall aerodynamic design to the rear of the truck.

A central rail (70) is mounted within the central housing, and guides the horizontal deployment of the central panel (20). Two flexible rods (55) are mounted longitudinally at each end of the housing (the same rod (55) is shown if FIG. 3). Cables (65) are connected between the rods (55) and the central panel (20). The cables (65) run continuously vertically to the side panels (10)—as shown in FIG. 3, and couple the central panel (20) to each side panel, via the flexible rod (55).

In the fully retracted position, the portion (75) of the cable (65) that connects between the flexible rod (55) and the central panel (20) is lax. However, there is a portion of the cable (65) that is mounted onto the central panel (20) in a guided manner, by, for example, a series of tubes (67). In FIG. 4, this portion of the cable (65) is shown as a well-defined series of unentangled, unengaged lines threaded through tube (67). The purpose of mounting the cables onto the central panel (20) in this manner is to keep the cables untangled in the retracted position.

At the front extremity (85) of the central panel (20), each cable (65) is attached to a bar (90) of the central housing. In the retracted position, the portion of cable (65) between the front end (85) of the panel and the bar (90) is lax; when deployed, it is taught.

As the panels deploy, the rods (55) each deploy with the panels. In FIG. 2, deployment of the flexible rod (55) is shown. Also shown in this figure are coupling elements (120, 122) to couple the central panel (20) to each side panel.

Figure 5:
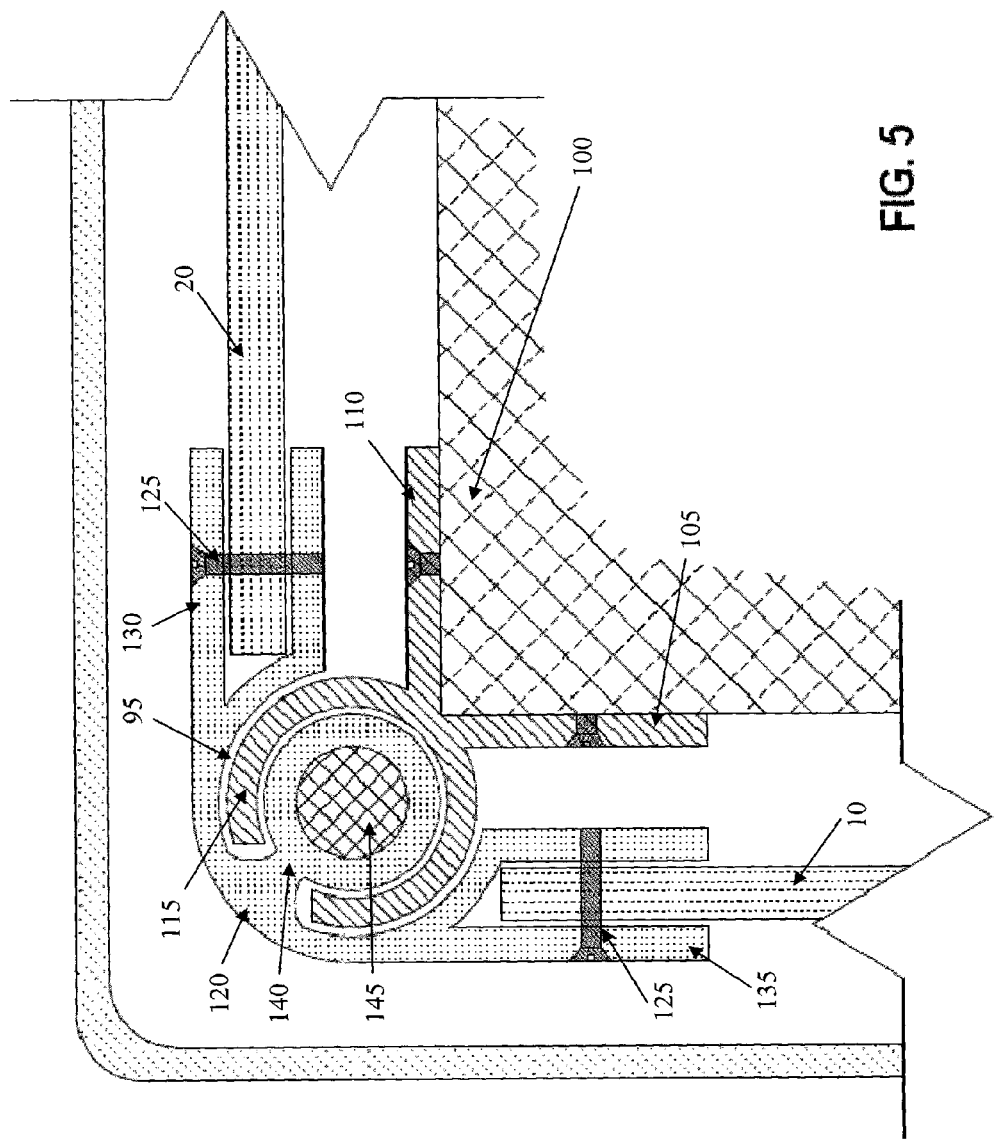
FIG. 5 illustrates the upper portion of a cross-section along the plane 1-1' in FIG. 4.

FIG. 5 illustrates an upper portion of a cross-section along the plane 1-1' in FIG. 4. A corner support element (95) is attached to each upper corner of the vehicle (100), and runs the length of the side housing and central housing. The corner support element (95) provides a track through which the flexible rod slides as the panels are deployed or retracted.

The corner support element (95) comprises a pair of supports, one at each upper corner of the vehicle. The corner support element (95) provides support for the flexible rod (not shown) that slides along the upper edge of the vehicle, as the panels retract and deploy. The support (95) design can consist of, but is in no ways limited to, two legs (105, 110) and central portion (115) that receives a coupling element (120). Each leg (105, 110) is affixed to the top and side of the vehicle. In this embodiment, screws (125) are used, although alternative attachment means can be used. The central portion (115) can for example, have a central circular shape cut-out as shown in FIG. 5. This shape is designed to allow the flexible rod (not shown) to slide back and forth within the housing. The corner support element (95) runs the length of the housing.

The coupling element (120) couples the central panel (20) to a side panel (10) at the each upper corner of the vehicle. The coupling element (120), consists for example, of two legs (130, 135), each of which overlaps a portion of the side (10) and central panel (20), respectively. The legs are attached to each panel by means such as (but not limited to) screws, adhesive or integrated by some similar attachment means. The central portion of the coupling means (120) has an abutment (140) that is shaped to fit into the cut-out portion of central portion (115) of the support (95). In the figure, the abutment (140) is shaped in a circular form, to fit into the circular cut-out of the central portion (115). The abutment further contains a circular aperture (145), in which one end of the flexible rod will be placed. Coupling element (120) will move with the panels as they retract and deploy, moving along the track provided by the cut-out portion of the corner support means. It is understood that the illustrated coupling element (120) is merely one embodiment, and is in way limited to the form shown in the figure. Other shapes and configurations which couple the side and central panels, while providing means for the flexible rod to slide, are also envisaged.

Coupling element (120) is scaled to fit in the cavity of the housing depending on size of design. Coupling element (120) is constructed of a strong material resistant to wear and corrosion and with low friction properties.

Figure 6:
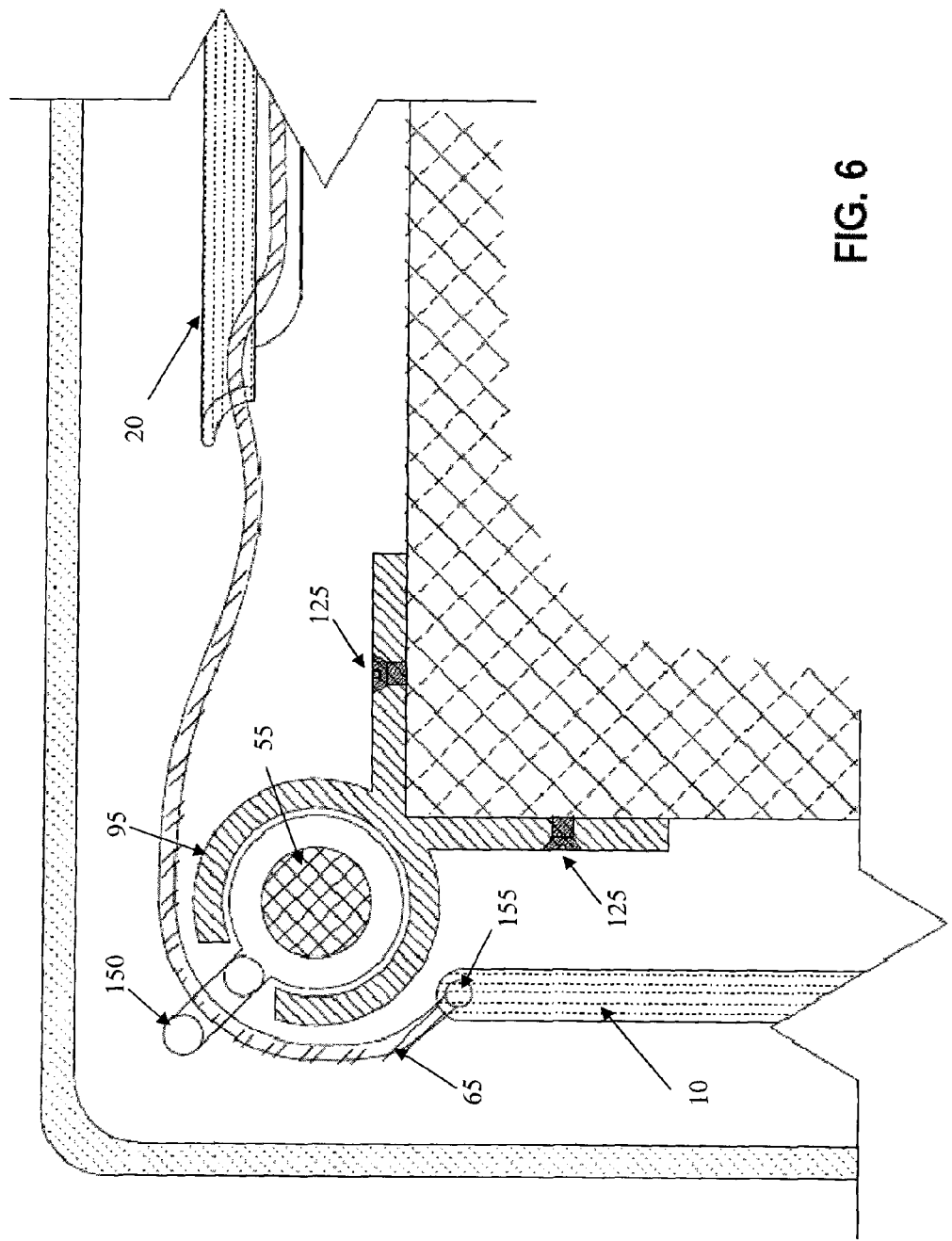
FIG. 6 illustrates a cross-sectional view along 3-3' of FIG. 4.

FIG. 6 illustrates a cross-sectional view along 3-3' of FIG. 4. As in FIG. 5 the corner support element (95) is shown, along with the attachment screws/bolts (125). At this section, the flexible rod (55) is shown. The rod has a first diameter that extends through most of the rod. It has a smaller, second diameter, at the end of the rod which fits into the coupling element (shown in FIG. 5 as reference numeral 120). Here, the connection of one of the connecting cables (65) is shown in further detail. It is attached at the extremity of side panel (10), loops round the corner support means (95), and attaches to the central panel (20). The cable (65) loops around the corner support means (95), by use of (but not limited to), for example, an eyelet (150), through which the cable passes. This prevents the cable from getting tangled with the rod (55) and the corner support means (95). In addition, the eyelet (150) on the rod (55) maintains the cable (65) at a predetermined position on the length of the rod (55) which matches the attachment position (155) on the side and top panels (10, 20).

Figure 7:
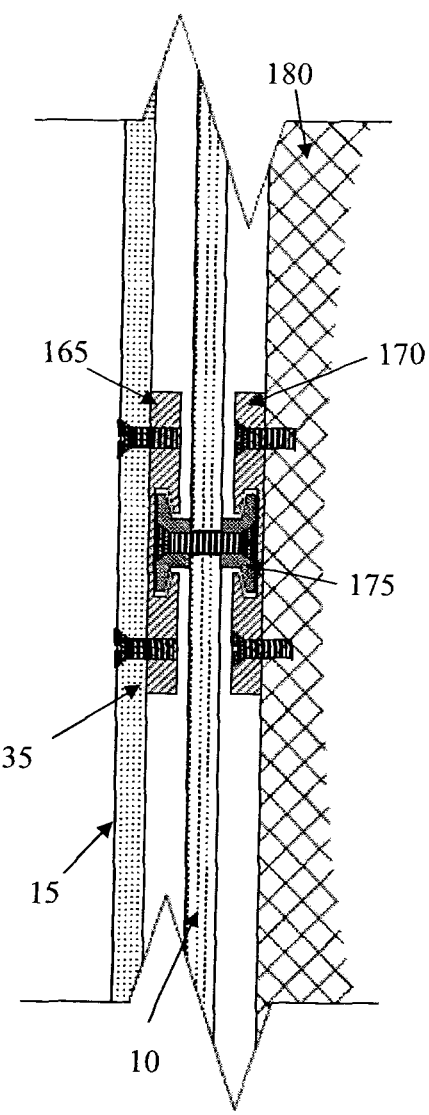
FIG. 7 illustrates a cross-sectional view of a rail mounted in the side housing and coupled to a side panel.

FIG. 7 illustrates a cross-sectional view of the rail (35) mounted in the side housing (15), and coupled to a side panel (10). The rail (35) comprises two tracks (165, 170) and connecting elements (175). The connecting element (175) can be, for example, cylindrical in shape (other shapes are possible). The inner track (170) is mounted onto the outside of the vehicle (180), using conventional means of attachments, such, as, for example, screws, nuts/bolts, adhesive or other attachment means. The outside track (165) is mounted to the side housing (160) by similar attachment means. Within each track is an aperture that receives a connecting element (175), which also protrudes the side panel (10). The side panel (10) should not slide to the right or left while it is coupled to the connecting element. One way to prevent this occurrence, though by no way limited to such means, is to provide the connecting element (175) with a first and second radius. The first radius is smaller than the second radius so that the side panel (10) will not slide to the right or left. Other configurations are possible, so long as the side panel (10) remains in a stable position, without moving to the right or left.

In this example, the connecting element (175) is akin to a "button" that couples the side panel (10) to the rails (165, 170). There are a number of connecting elements spaced evenly through the length of the rail. The panel slides in and out via the connecting elements (175) which slide along the tracks (165, 170). This mechanism is also used to mount the central rail to the central housing, and couple the central panel to the central rail.

Figure 8:
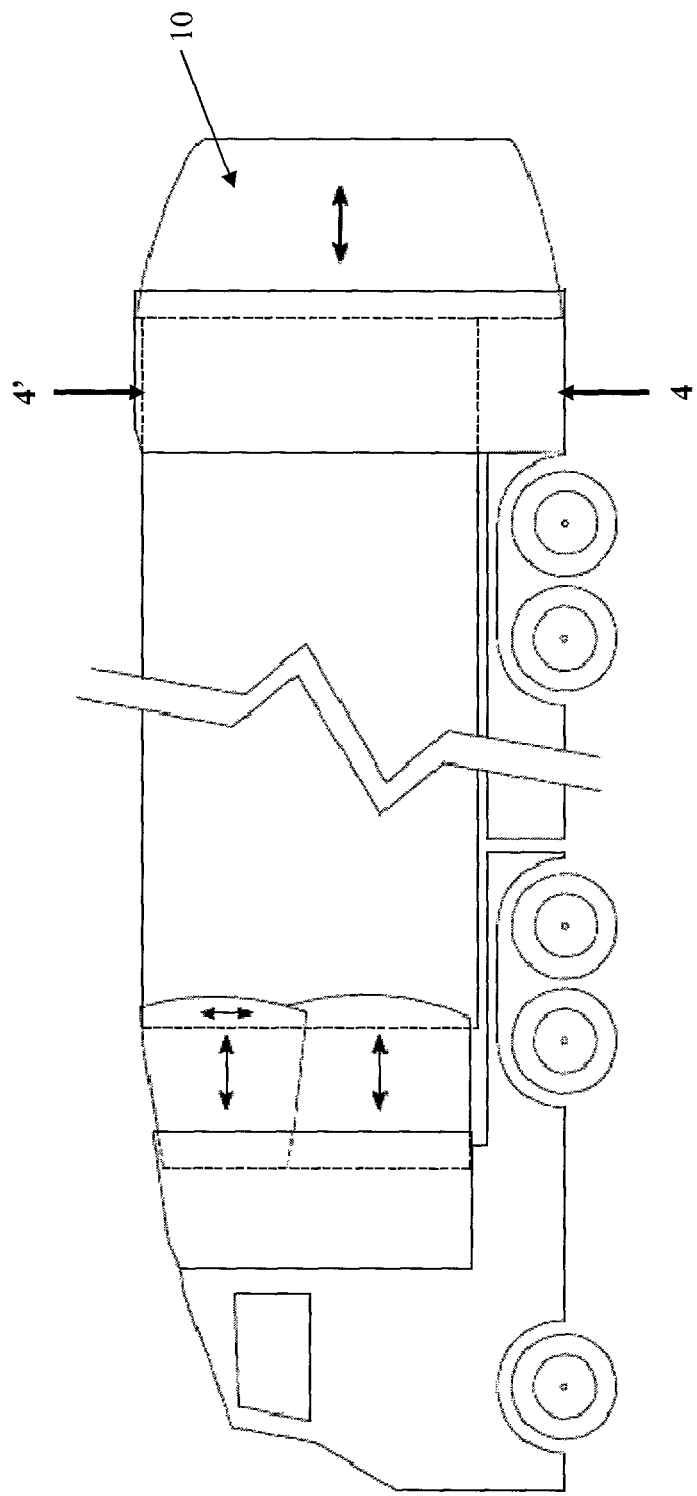
FIG. 8 illustrates a partial side view of a vehicle with a fully deployed apparatus consisting of three panels.

FIG. 8 illustrates a side view of a vehicle with a fully deployed apparatus consisting of three panels, where the side panel (10) is in full view.

Figure 9:
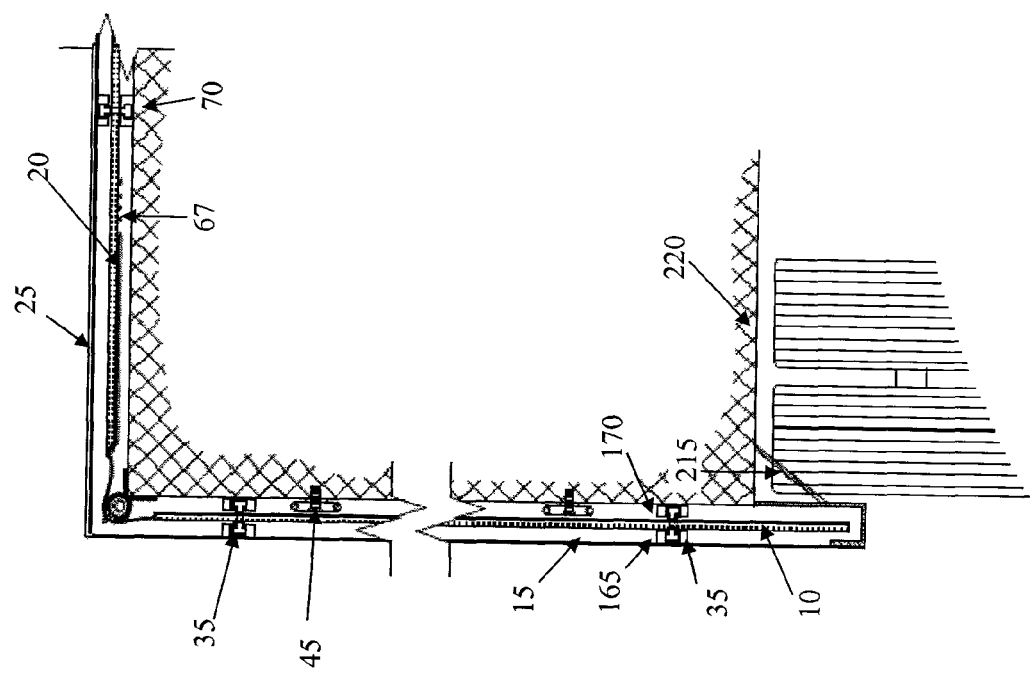
FIG. 9 illustrates a cross-sectional view along 4-4' of the apparatus shown in FIG. 8.

FIG. 9 illustrates the cross section along 4-4' of the vehicle shown in FIG. 8. As shown on the side of the vehicle, the side housing (15) contains one or more rails (35). Each rail comprises an inner track (170) and an outer track (165), with a connecting element that couples the side panel (10) to the rail (35). The side housing (15) also contains the pulleys (45). The side housing (15) can extend below the vehicle floor. It can also extend just to vehicle floor (220). If the housing (15) extends below the vehicle floor, as shown in this embodiment, then it is preferable to attach a stabilizing brace (215) from the lower end of the housing (15) to the base of the truck.

Also shown in FIG. 9 is the central rail (225) mounted to the central housing (25), with connecting elements that couple the central panel (20) to the central rail (70). The connecting elements run through the length of the central panel (20). Also shown are alignment element (67) to hold the cables (65) in place along the length of the central panel (20). The correspond to the tubing (67) shown in FIG. 4. The alignment elements (67), include, but are not limited to, tubing attached to the underside of the central panel, through which the cables are threaded. The alignment elements (67) are designed to keep the cables from getting tangled along the length of the central panel when it is in a retracted position. The alignment elements (67) also serve another purpose, namely, it provides a path for the cables to follow along the contour of the central panel (20) when the central panel (20) is in its fully deployed position.

Figure 10:
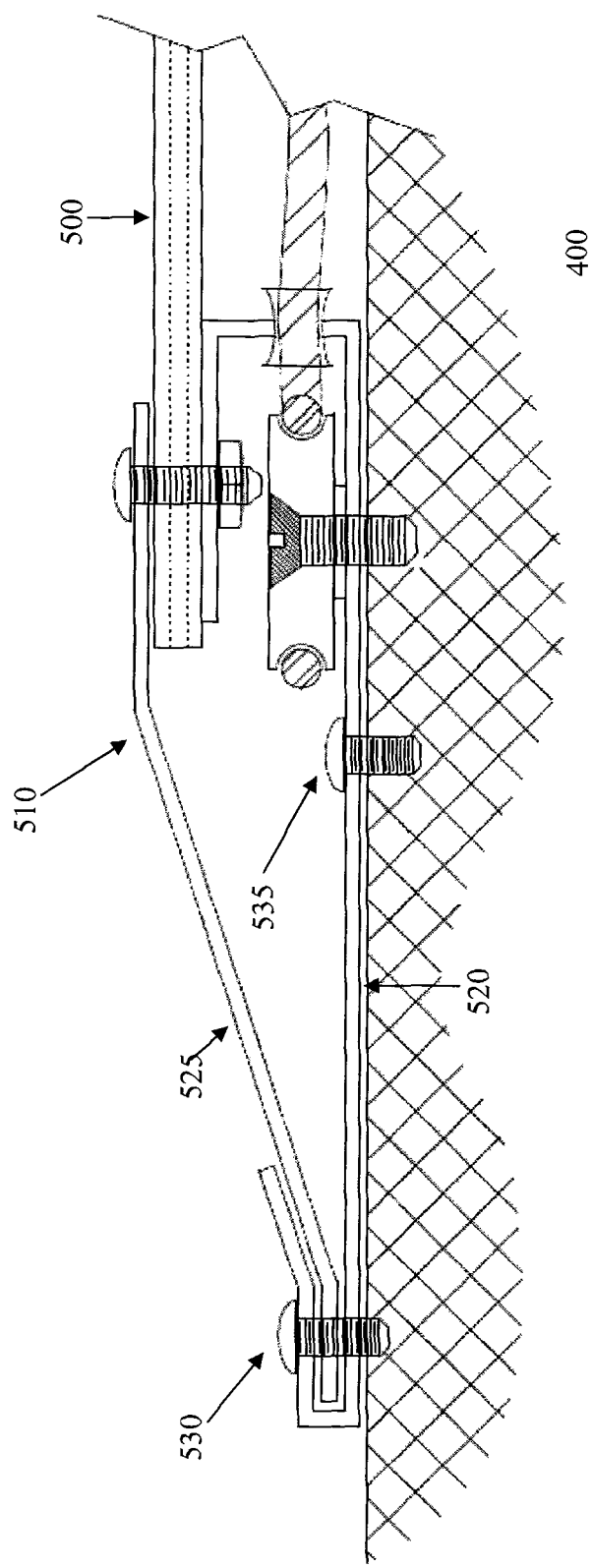
FIG. 10 illustrates an example of an attachment of an end of each housing panel to the vehicle.

FIG. 10 illustrates the attachment of an end of each housing panel (500) to the vehicle. The housing panel (500) is itself housed within a housing end unit (510); i.e. where there are three aerodynamic panels, there are a total of three housing units: one for each side housing, and one for the central upper housing. The housing unit design can consist of, but is not limited to, two pieces of metal (520, 525). The base portion (520) is affixed to the vehicle (400), by, for example, screws, nuts/bolts adhesive or other attachment means. An upper portion (525) extends from the base unit (520) and overlaps with the housing panel (500). The upper portion (525), base portion (520) and housing panel (500) are all coupled by, for example, a bolt and nut (530,535). The shape of the housing unit is such that it provides an aerodynamic design as the vehicle travels. In FIG. 10, the design shown is angled; however, the shape of the housing is not limited to such a configuration, so long as an aerodynamic design is provided.

The housing end unit (510) serves to prevent wind and debris from entering into the side housing and central housing and to provide a smooth finish to the sides of the vehicle.

The side housing units run along the height of the vehicle, while the central unit runs along its width. Each side housing unit houses the pulleys used for the retraction/deployment of the side panels, whereas the central housing unit does not house any pulleys.

In addition, there is an optional feature of attaching bristles to the inner surface of each housing panel, and/or attaching bristles to the outside surface of the vehicle. The aerodynamic panel then moves along a track surrounded on one or both sides by bristles. This allows for cleaning the surface of the panels as they retract and deploy. When the panels are in the retracted position, the bristles guard the opening from debris, snow or foreign matter.

The remaining Figures illustrate an embodiment of the invention applied to the rear of a cabin. The two-way arrows represent the direction of movement of the panels as they deploy and retract.

Figure 11:
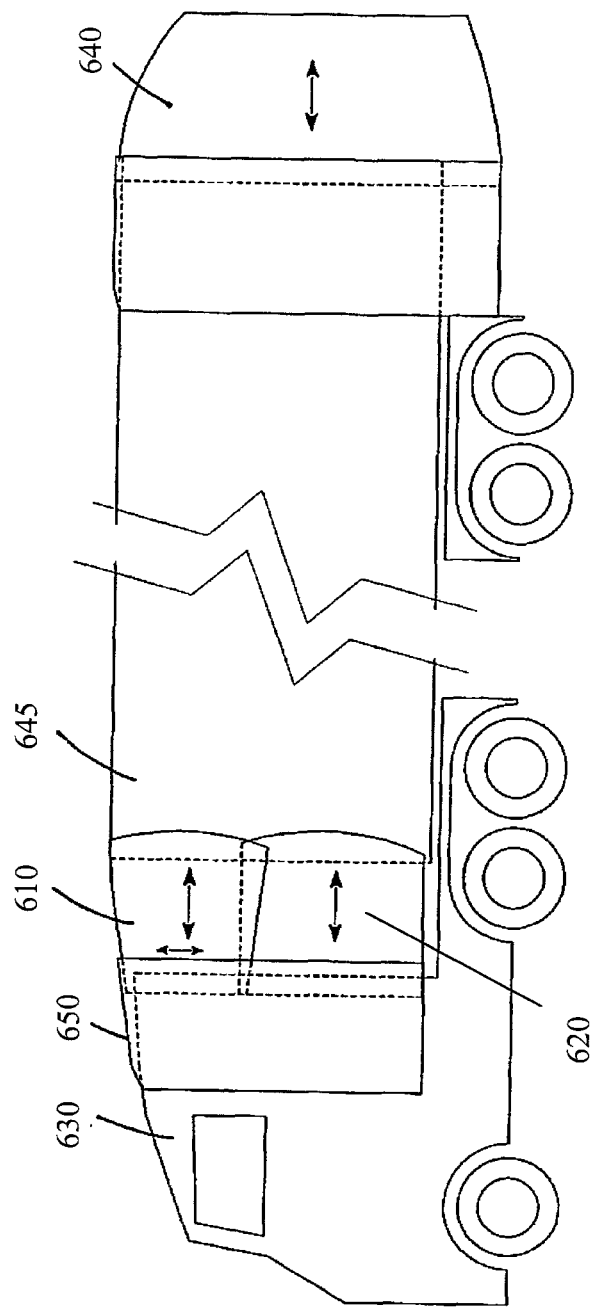
FIG. 11 illustrates a side view of an apparatus of the present invention in which aerodynamic panels are deployed behind a tractor cabin and at the rear of a vehicle.

FIG. 11 illustrates a side view in which aerodynamic panels (610, 620) deployed behind the tractor cabin (630) and at the rear (640) of a vehicle. The description that follows refers to the panels deployed behind (610, 620) the tractor cabin (630). The size of the panels (610, 620) can vary according to the size of the vehicle, and according to the aerodynamic design. Furthermore, the shape of each panel can be varied, so long as the combination of provides an aerodynamic design to the space between the rear of the tractor cabin (630) and the front of an attached trailer (645). The panels are constructed of flexible, lightweight material such as, though not limited to, metal, plastic, fabric or any flexible material. One, preferably two panels, are used on each side and at the top, as described below.

The panels (610, 620) retract into a housing (650). In this embodiment, the housing (650) is located on the rear of the cabin (630). The housing (650) serves to not only store the aerodynamic panels (610, 620), but also house the underlying retraction/deployment mechanism (not shown in FIG. 11). The shape of the housing unit (650) is such that it provides an aerodynamic design as the vehicle travels. The shape of the housing is not limited the configuration shown in FIG. 11, as long as an aerodynamic design is provided. The housing unit (650) serves to prevent wind and debris from entering into the deployment mechanism, and to provide a smooth finish to the sides of the vehicle.

Figure 12:
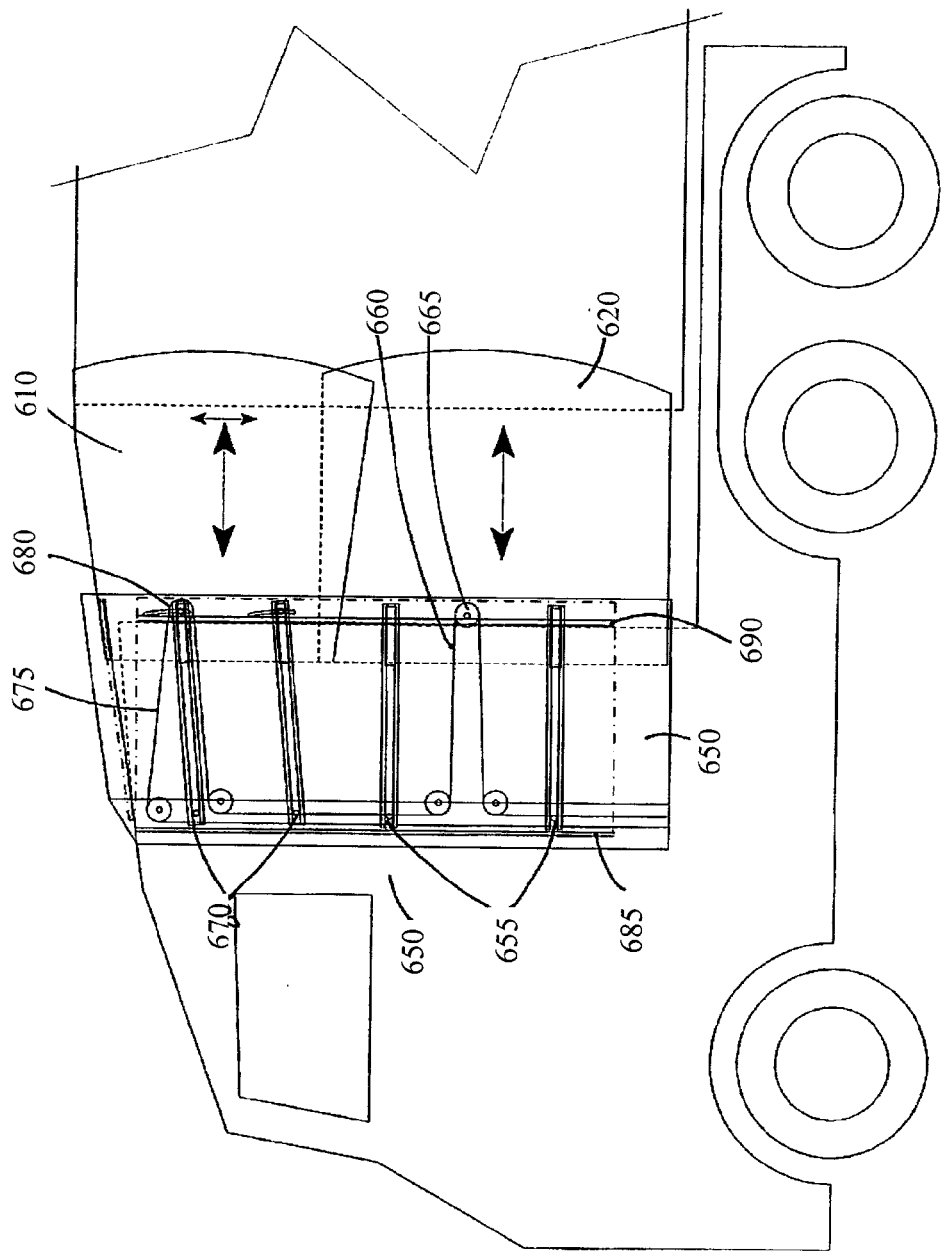
FIG. 12 illustrates a cut-away view of a side housing of the apparatus in use behind the tractor cabin as shown in FIG. 11, in which the retraction mechanism of the side panels is shown, while the side panels are fully deployed.

FIG. 12 illustrates a cut-away view of a side housing (650) of the vehicle shown in FIG. 11, in which the retraction mechanism of the side panels (610, 620) is shown, while the side panels (610, 620) are fully deployed. One side panel (620) moves horizontally on one or more rails (655), with the movement of the panel (620) controlled by a system comprising rails (655), cables (660) and pulleys (665). The cable/pulley system can either be motorized or used manually. If the system is motorized, it is connected to a motor (not shown) that is preferably located at the base of the truck.

Another side panel (610) moves in a straight-angled trajectory, with the movement of the panel (610) controlled by a system comprising angled rails (670), cables (675) and pulleys (680). The angle of the tracks (670) determines the angle of deployment/retraction of panel (610). Two frames (685, 690) are also shown. One frame (670) is proximal to the rear of the cabin (650), whereas a second frame (690) is distal to the rear of the cabin (645). The proximal frame (685) is mounted closest to the rear of the passenger cabin (650), while the distal frame (690) is mounted closest to the rear of the rails. Frames can be mounted to the truck cabin or in a preferred embodiment to the truck frame. The rails are mounted between the distal and proximal frames (685, 690). Each frame is discussed in further detail in FIG. 14.

The number of rails, and their respective spacing, can vary, depending on the height of the side panel. Taller panels will require more rails to ensure stability of deployable movement. Each set of rails (655, 670) guides the deployment of the respective panels (620 and 610).

Pulleys (665, 680) are mounted, for example, at each end of the housing. The cable (660, 675) which is wound around the pulleys controls the extent of the extension of the panel. The same arrangement is found on the other side of the vehicle.

Figure 13:
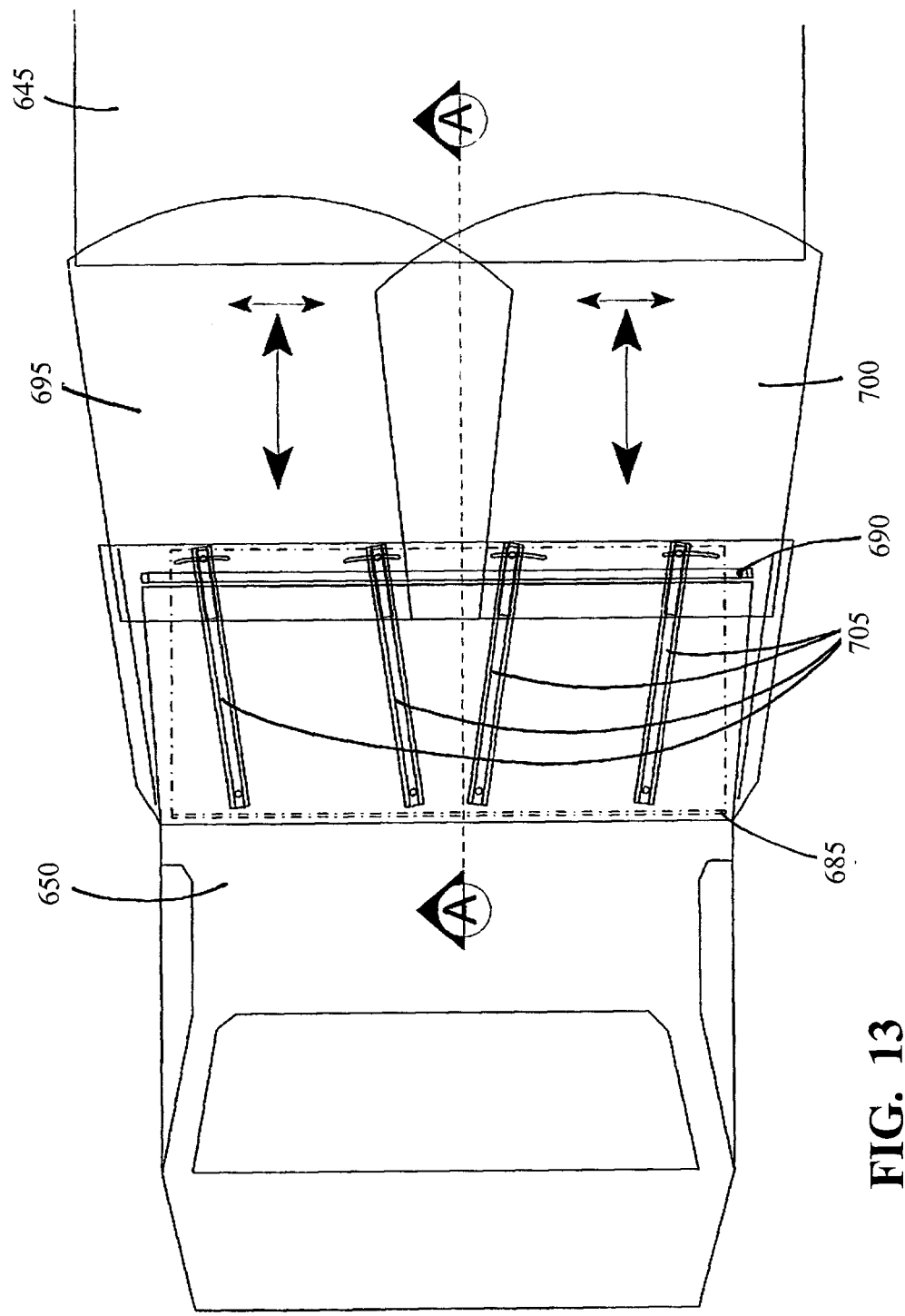
FIG. 13 illustrates a cut-away view of the central housing of the apparatus shown in FIG. 11, in which the retraction mechanism of the top portion of panels is shown, while the panels are fully deployed.

FIG. 13 illustrates a cut-away view of the central housing of the vehicle shown in FIG. 11, in which the retraction mechanism of the top portion of panels (695, 700) is shown, while the panels (695, 700) are fully deployed. In this embodiment, the panel (700) shown in FIG. 13 and panel (610) shown in FIG. 12 are joined together, and thus, form one continuous unit. Similarly, panel (695) is joined to the upper side panel on the other side of the vehicle (not shown).

The shape of the central panels (695, 700) is designed so as to fit snugly over the gap between the rear cabin (650) and the front of the trailer (645), and provide an overall aerodynamic design.

Central rails (705) are mounted within the central housing to guide the deployment of the central panels (695, 700). While four rails are shown in FIG. 13 the number of rails can vary, so long as a stable means is used to deploy the panels. The upper portion of the proximal (685) and distal (690) frames are also shown. The rails (705) are mounted between each of these frames (685, 690). The rails are preferably hinged onto the stationary proximal frame (685) and the proximal frame is preferably mounted to the vehicle frame below the cabin. The rails are supported and operated up and down at the distal frame (690) and in and out (or sideways) by the distal frame (690).

Figure 14:
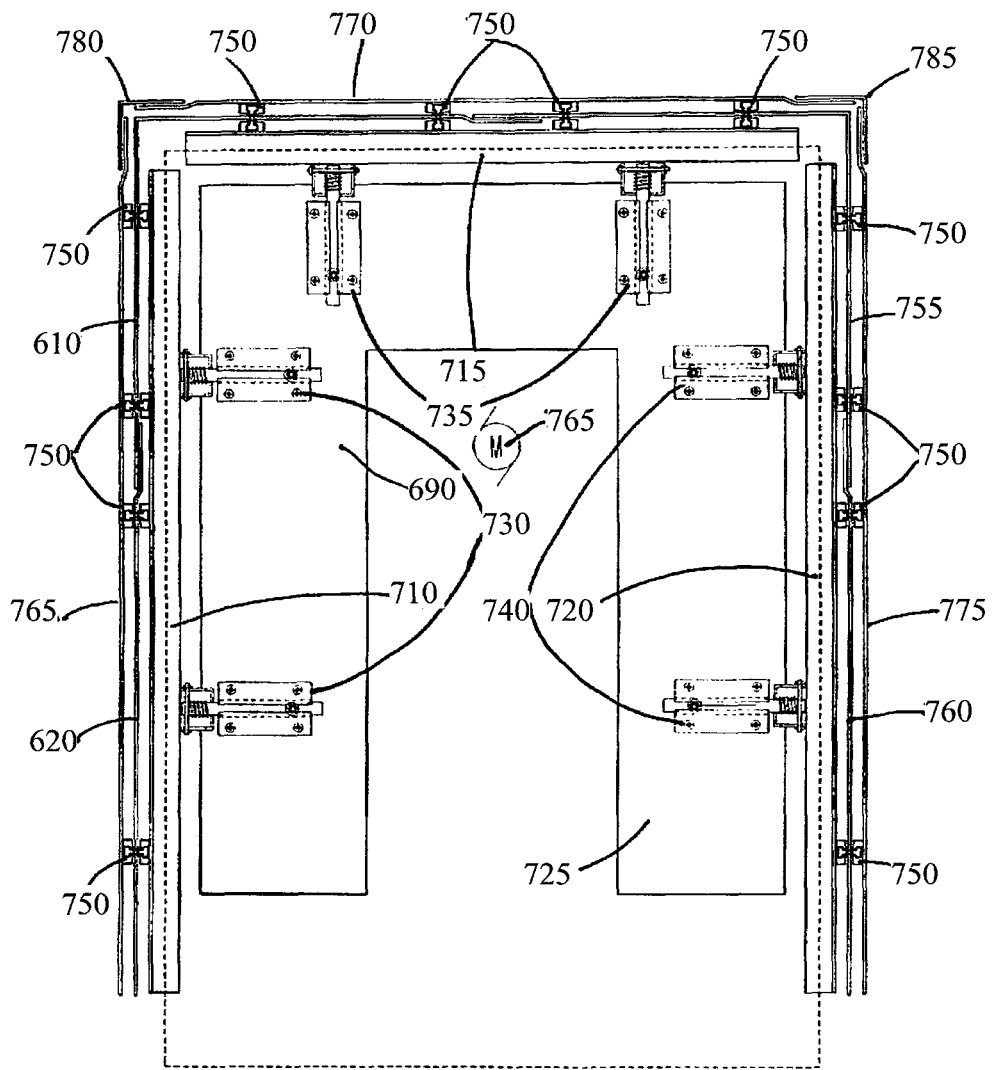
FIG. 14 is a plan view of an example of a distal frame support structure of the apparatus shown in FIG. 12.

FIG. 14 is a plan view which shows details for one example of a distal frame (690) preferably mounted to the vehicle frame near the rear of the cabin. The distal frame (690) consists of three rail supports (710, 715 and 720) mounted to a central supporting frame (725) by a series pistons (730, 735 and 740).

The supports (710, 715, and 720) support guide rails (750) upon which the panels (620, 610, 755 and 760) are deployed. The number of rails and pistons can vary, so long as the panels deploy in a stable manner. Mounted on the central supporting frame (725), are a series of automated activators, which, for example, may be pistons (730, 735 and 740). In addition, the pistons may be attached to a motor (765), or may each be motorized individually. The activators operate in a coordinated fashion. Upon activation, each piston pushes perpendicular upon the respective rail support, which in turn, pushes each panel outward. For example pistons (730) push out onto support (710), which in turn, pushes out panels (620 and 610). As all the pistons are coordinated via optional motorized system, all of the panels (620, 610, 755 and 760) will push out in a coordinated fashion. Therefore, side supports 710 and 720 will push out horizontally, while top support 715 will push out vertically.

Meanwhile, a separate optional motorized system of pulleys, cables and an optional motor (not shown), deploy the panels (620, 610, 755 and 760) from the rear of the cabin (not shown) toward the front of the trailer (not shown). The panels (620, 610, 755 and 760) "fan out" (due to the motion of the pistons (730, 735 and 740) as they are deployed. Once the panels (620, 610, 755 and 760) are fully deployed, the pistons (730, 735 and 740) are retracted (via the motorized system), leading to a tight fit of the panels (620, 610, 755 and 760) over the sides of the trailer (not shown).

The rails (750) for panels (610, 755) are able to slide in guides (not shown) on the supports (710, 715 and 720) and on the external housing panels (765, 770, 775). Corner closing elements (780, 785) are attached near the proximal frame and follow the in and out movement of external housing panels (765, 770, 775) when side supports (710, 715 and 720) are pushed in and out.

Figure 15:
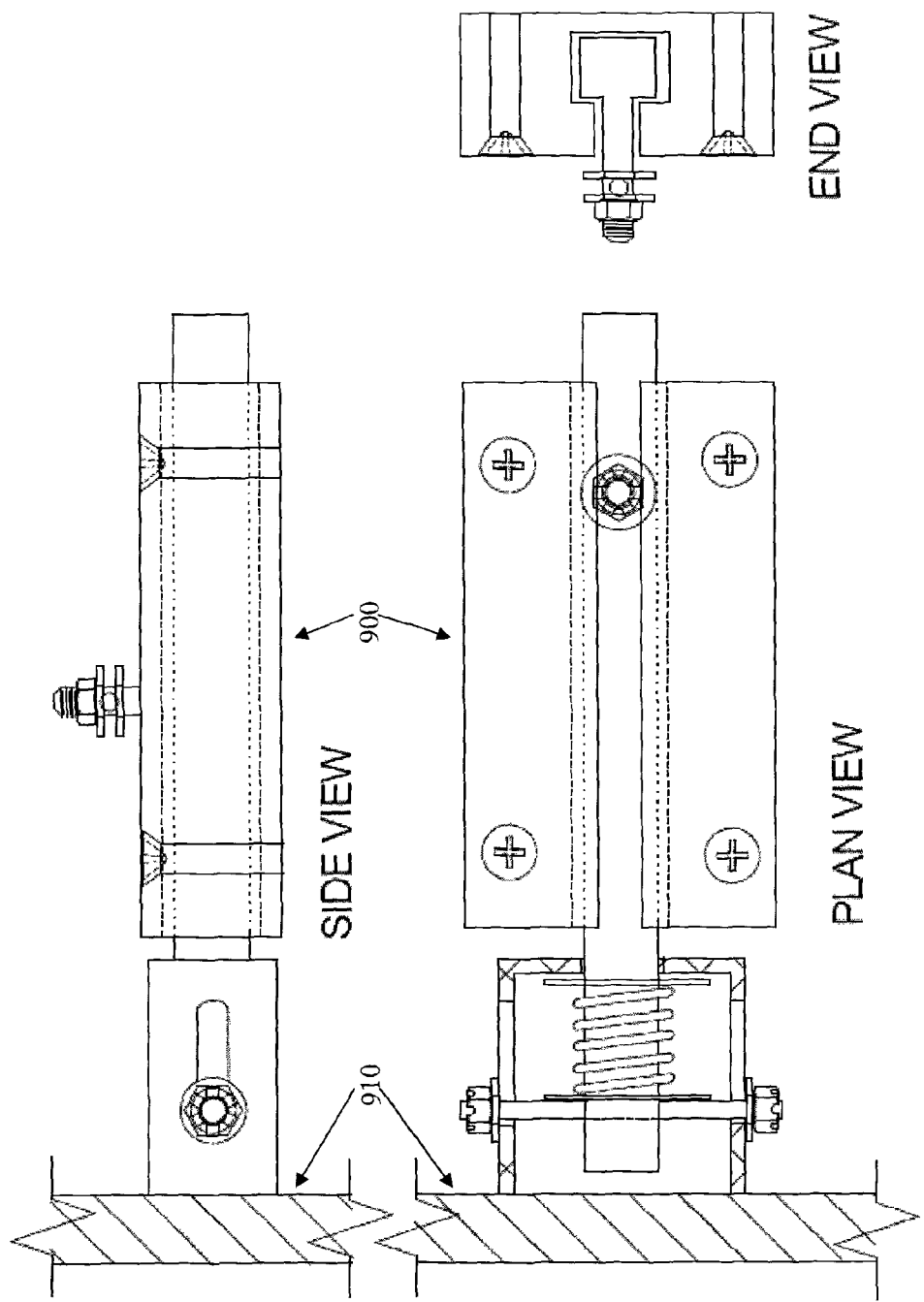
FIG. 15 illustrates side, plan and end views of an example of a piston shown in FIG. 14.

FIG. 15 illustrates side, plan and end views of an example of a piston (900) (i.e. any one of pistons 730, 735 or 740 shown in FIG. 14, used in conjunction with the side support (910) (i.e. any one of respective side supports 710, 715 or 720 shown in FIG. 14). The piston (900) is mounted onto a distal central supporting frame (not shown) onto the rear of the truck cabin, while the side support (910) is mounted to the piston (900) and used to support and operate rails (not shown). The distal central supporting frame (not shown) is preferably mounted onto the vehicle frame near the rear of the truck cabin.

Figure 16:
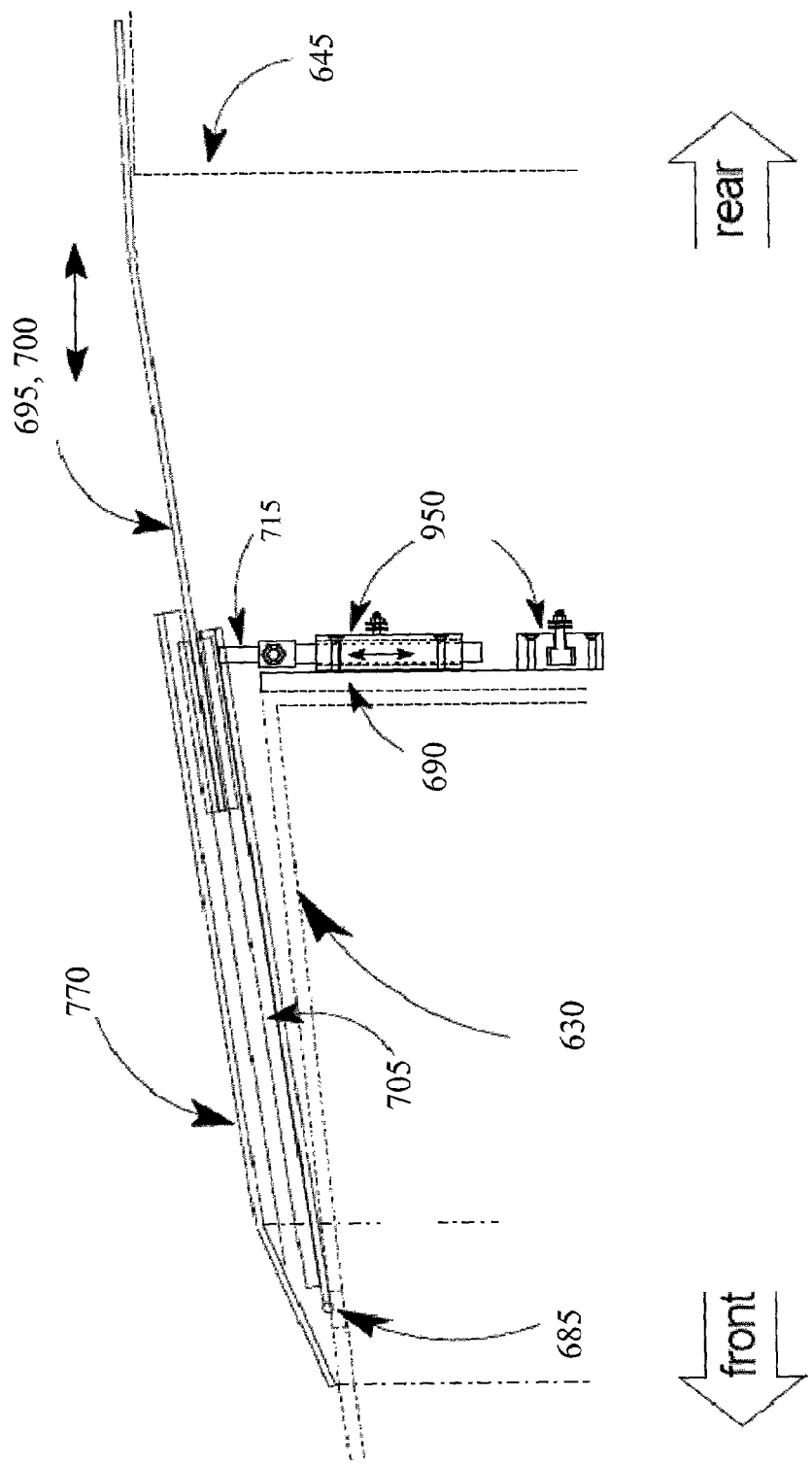
FIG. 16 illustrates a cross-sectional view taken along the line A-A of FIG. 13.

FIG. 16 illustrates a cross-sectional view taken along the line A-A of FIG. 13. A piston (950) is mounted to the distal frame (690) via the support (715). When actuated, the piston (950) pushes perpendicularly the top panels (695, 700) as they slide out. The panels (695, 700) are housed in housing panel (770), which also contains the rails (705) upon which the panels (695, 700) slide. The rails (705) are mounted between the proximal frame (685) and the distal frame (690). The cabin (630) and trailer front (645) are also shown.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. An apparatus for reducing drag on a transport vehicle, said apparatus comprising:
   a) aerodynamic panels for deployment in a direction opposite of travel of the transport vehicle comprising: a first set of one or more aerodynamic panels adjacent a left side of the transport vehicle; a second set of one or more aerodynamic panels adjacent a right side of the transport vehicle; and a third set of one or more aerodynamic panels adjacent a top side of the transport vehicle, with:
      i. each aerodynamic panel sliding in a plane parallel to an adjacent side of the transport vehicle between a retracted position and a deployed position; and
      ii. the aerodynamic panels shaped and dimensioned to assemble into a continuous aerodynamic structure upon full deployment;
   b) a first housing located adjacent the left side of the transport vehicle for receiving the first set of one or more aerodynamic panels in the retracted position; a second housing located adjacent the right side of the transport vehicle for receiving the second set of one or more aerodynamic panels in the retracted position; and a third housing located adjacent the top side of the transport vehicle for receiving the third set of one or more aerodynamic panels in the retracted position;
   c) guide means connecting each housing to the corresponding set of one or more aerodynamic panels, for guiding each set of one or more aerodynamic panels between the retracted position and the deployed position;
   d) interconnecting means between the aerodynamic panels for providing coordinated deployment and retraction thereof; and
   e) activation means for deployment and retraction of the aerodynamic panels; wherein during deployment, the first, second and third sets of one or more aerodynamic panels assemble to provide the continuous aerodynamic structure; and during retraction, the first, second and third sets of one or more aerodynamic panels separate in a coordinated manner.

2. The apparatus of claim 1, wherein said aerodynamic panels are deployed at the rear of said vehicle.

3. The apparatus of claim 1, where said aerodynamic panels are deployed between a cabin and an attached trailer.

4. The apparatus of claim 1 comprising three aerodynamic panels.

5. The apparatus of claim 1, wherein deployment and retraction of said aerodynamic panels is manual.

6. The apparatus of claim 1, wherein deployment and retraction of said panels is automated.

7. The apparatus of claim 1, wherein a series of pulleys, wires and flexible rods are used to coordinate deployment and retraction of said aerodynamic panels.

8. An apparatus for reducing drag at the rear of a moving transport vehicle, said apparatus comprising:
   aerodynamic panels for deployment in a direction opposite of travel of the transport vehicle comprising a first set of one or more aerodynamic panels adjacent a left side of the transport vehicle; a second set of one or more aerodynamic panels adjacent a right side of the transport vehicle; and a third set of one or more aerodynamic panels adjacent a top side of the transport vehicle, with:
      i. each aerodynamic panel sliding in a plane parallel to an adjacent side of the transport vehicle between a retracted position and a deployed position; and
      ii. the aerodynamic panels shaped and dimensioned to assemble into a continuous aerodynamic structure upon full deployment;
   b) a first housing located adjacent the left side of the transport vehicle for receiving the first set of one or more aerodynamic panels in the retracted position; a second housing located adjacent the right side of the transport vehicle for receiving the second set of one or more aerodynamic panels in the retracted position; and a third housing located adjacent the top side of the transport vehicle for receiving the third set of one or more aerodynamic panels in the retracted position;
   c) guide means connecting each housing to the corresponding set of one or more aerodynamic panels, for guiding each set of one or more aerodynamic panels between the retracted position and the deployed position;
   d) interconnecting means between the aerodynamic panels for providing coordinated deployment and retraction thereof; and
   e) activation means for deployment and retraction of the aerodynamic panels; wherein during deployment, the first, second and third sets of one or more aerodynamic panels assemble to provide the continuous aerodynamic structure; and during retraction, the first, second and third sets of one or more aerodynamic panels separate in a coordinated manner.

9. The apparatus of claim 8 wherein the first set consists of one aerodynamic panel, the second set consists of one aerodynamic panel, and the third set consists of one aerodynamic panel.

10. The apparatus of claim 9 further comprising an aerodynamic panel adjacent to a bottom rear surface of said vehicle.

11. The apparatus of claim 8, wherein each housing is located on an outside surface of said vehicle.

12. The apparatus of claim 8, wherein deployment and retraction of said aerodynamic panels is manual or automated.

13. The apparatus of claim 8, wherein a series of pulleys, wires and flexible rods are used to coordinate deployment and retraction of said aerodynamic panels.

14. An apparatus for reducing drag behind a cabin of a transport vehicle, said apparatus comprising:
   a) aerodynamic panels for deployment in a direction opposite of travel of the transport vehicle comprising: a first set of one or more aerodynamic panels adjacent a left side of the transport vehicle; a second set of one or more aerodynamic panels adjacent a right side of the transport vehicle; and a third set of one or more aerodynamic panels adjacent a top side of the transport vehicle, with:
      i. each aerodynamic panel sliding in a plane parallel to an adjacent side of the transport vehicle between a retracted position and a deployed position; and
      ii. the aerodynamic panels shaped and dimensioned to assemble into a continuous aerodynamic structure upon full deployment;
   b) a first housing located adjacent the left side of the cabin for receiving the first set of one or more aerodynamic panels in the retracted position; a second housing located adjacent the right side of the cabin for receiving the second set of one or more aerodynamic panels in the retracted position; and a third housing located adjacent the top side of the cabin for receiving the third set of one or more aerodynamic panels in the retracted position;

c) guide means connecting each housing to the corresponding set of one or more aerodynamic panels, for guiding each set of one or more aerodynamic panels between the retracted position and the deployed position;

d) interconnecting means between the aerodynamic panels for providing coordinated deployment and retraction thereof; and e) activation means for deployment and retraction of the aerodynamic panels; wherein during deployment, the first, second and third sets of one or more aerodynamic panels assemble to provide the continuous aerodynamic structure; and during retraction, the first, second and third sets of one or more aerodynamic panels separate in a coordinated manner.

15. The apparatus of claim 14, wherein the first set consists of two aerodynamic panels and the second set consists of two aerodynamic panels.

16. The apparatus of claim 14, wherein each of said aerodynamic panels initially moves perpendicular to said cabin while being deployed.

17. The apparatus of claim 14, wherein deployment and retraction of said aerodynamic panels is manual or automated.

\* \* \* \* \*